United States Patent [19]

Crivello

[11] 4,108,747

[45] Aug. 22, 1978

[54] CURABLE COMPOSITIONS AND METHOD FOR CURING SUCH COMPOSITIONS

[75] Inventor: James V. Crivello, Elnora, N.Y.

[73] Assignee: General Electric Company, Schenectady, N.Y.

[21] Appl. No.: 705,149

[22] Filed: Jul. 14, 1976

[51] Int. Cl.$^2$ .......................... C08F 2/50; C08F 4/00
[52] U.S. Cl. ................... 204/159.18; 96/35.1; 96/115 R; 96/115 P; 204/159.24
[58] Field of Search ............... 204/159.18, 159.24; 96/115 R, 115 P, 35.1

[56] References Cited

U.S. PATENT DOCUMENTS

| 3,347,676 | 10/1967 | Cripps | 96/115 P |
| 3,403,199 | 9/1968 | Ramos | 260/830 TW |
| 3,842,019 | 10/1974 | Kropp | 204/159.24 X |

Primary Examiner—Walter C. Danison, Jr.
Attorney, Agent, or Firm—William A. Teoli; Joseph T. Cohen; Charles T. Watts

[57] ABSTRACT

Cationically polymerizable compositions are provided, such as epoxides, vinyl ethers, and N-vinyl compounds having an effective amount of aryl onium trifluoromethane sulfonate salts, such as a triphenyl sulfonium trifluoromethane sulfonate and diphenyliodonium trifluoromethane sulfonate. The curable compositions are polymerizable under ultraviolet radiation. In addition to being used as adhesives, encapsulents and in coating applications, the aforementioned curable compositions can be employed as photoresists and as printing inks.

6 Claims, No Drawings

CURABLE COMPOSITIONS AND METHOD FOR CURING SUCH COMPOSITIONS

The present invention relates to cationically polymerizable compositions containing a polyaryl onium salt. More particularly, the present invention relates to the use of certain triphenyl sulfonium salts or diphenyl iodonium salts having anions derived from strong organic acids as photoinitiators for a variety of cationically polymerizable organic materials.

Prior to the present invention, cationic sensitive monomers, such as epoxides, were cured with acid catalysts, as taught by Kropp U.S. Pat. No. 3,842,019. For example, epoxides can be cured with boron trifluoride and complexes thereof, while styrene can be polymerized with aluminum trifluoride. In addition, 1,4-diazo bicyclo [2.2.2]octane can be polymerized with benzene sulfonic acid. While the curing of such monomers with such catalyst has been found to provide effective results in many instances, acid catalysts are often objectionable because such catalysts are highly corrosive to various substrates such as metals. In addition, many of these acid catalysts do not have a satisfactory shelf life once they have been mixed with the material to be polymerized. In addition, prior art catalysts, such as $BF_3.NH_2C_2H_4$ are moisture sensitive.

In order to overcome the disadvantages of the prior art catalysts, Kropp employed certain sulfonic acid salts which were activated thermally. In particular instances, the cationic cure of various compositions can be facilitated if a particular photosensitive sulfonic acid salt, such as the corresponding silver salt, is used as the catalyst. However, elevated cure temperature requirements, such as 300° F-400° F or extended cure times, rendered such curable mixtures unsuitable for manufacturing heat sensitive electronic components. In addition, the photosensitivity of the sulfonic acid salts required for reducing the total cure time of the curable mixtures as a result of combining UV irradiation with a subsequent thermal treatment was preferable, based on the use of expensive metal salts, such as silver salts. As a result, the use of such sulfonic acid metal salt compositions are often restricted to applications where elevated temperatures, such as up to 400° F can be tolerated.

The present invention is based on the discovery that certain photosensitive trifluoromethane onium salts selected from (1) $[(R)_a(R^1)_b(R^2)_c S]^+ [XSO_3]^-$, and (2) $[(R^3)_d(R^4)_e I]^+ [XSO_3]^-$

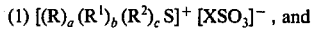
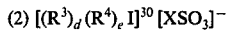

can be used to effect the cationic polymerization of a variety of cationically polymerizable monomers by exposure to UV irradiation followed by thermal treatment at temperatures significantly less than 300° F, where R is a monovalent aromatic organic radical, $R^1$ is a monovalent organic aliphatic radical selected from alkyl, cycloalkyl and substituted alkyl, $R^2$ is a polyvalent organic radical forming a heterocyclic or fused ring structure selected from aliphatic radicals and aromatic radicals, $R^3$ is selected from R radicals and $R^4$ is selected from divalent aromatic radicals, $a$ is a whole number equal to 0 to 3 inclusive, $b$ is a whole number equal to 0 to 2 inclusive, $c$ is a whole number equal to 0 or 1, where the sum of $a+b+c$ is a value equal to 3, $d$ is a whole number equal to 0 or 2, $e$ is 0 or 1 and $d+e$ is equal to 2 and X is a member selected from $C_{(6-13)}$ aromatic hydrocarbon radicals, $C_{(1-8)}$ alkyl radicals, halogenated derivatives thereof and fluorine.

Radicals included by X are more particularly aryl radicals, such as phenyl, tolyl, xylyl, etc.; haloaryl, such as chlorophenyl, fluorotolyl, etc.; alkyl radicals, such as methyl, ethyl, propyl, etc.; haloalkyl, such as trifluoromethyl, $C_3F_7$—, $C_8F_{17}$—, $C_4F_9$—, etc., etc.

There is provided by the present invention, curable compositions comprising:

(A) a cationically polymerizable organic material selected from the class consisting of epoxy resins, vinyl organic monomers, vinyl organic prepolymers, cyclic organic ethers, cyclic organic esters, cyclic organic sulfides, cyclic amines and organo silican cyclics, and (B) an effective amount of a radication sensitive triaryl onium salts of formulas (1) or (2).

Examples of triarylsulfonium salts of formula (1) and diaryl iodonium salts of formula (2) are:

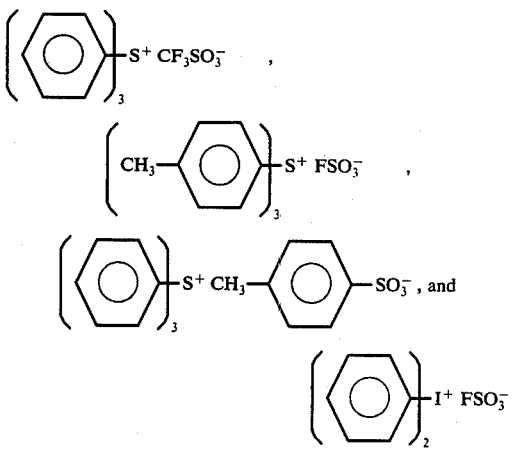

Included by the epoxy resins which can be used in the practice of the invention are, for example, any monomeric, dimeric, oligomeric or polymeric epoxy material containing one or a plurality of epoxy functional groups. For example, those resins which result from the reaction of Bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the *Encyclopedia of Polymer Science and Technology*, Vol. 6, 1967, Interscience Publishers, New York, pp 209–271.

Included by the vinyl organic monomers which can be used in the practice of the invention to make the polymerizable compositions covertible to thermoplastic polymers are, for example, styrene, vinyl acetamide, α-methyl styrene, isobutyl vinylether, n-octyl vinylether, acrolein, 1,1-diphenylethylene, β-pinene; vinyl arenes such as 4-vinyl biphenyl, 1-vinyl pyrene, 2-vinyl fluorene, acenaphthylene, 1 and 2-vinyl naphthylene; N-vinyl carbazole, N-vinyl pyroolidone, 3-methyl-1-butene; vinyl cycloaliphatics such as vinylcyclohexane, vinylcyclopropane, 1-phenylvinylcyclopropane, isobutylene; dienes such as isoprene, butadiene, 1,4-pentadiene, etc.

Some of the vinyl organic prepolymers which can be used to make the polymerizable compositions of the present invention are, for example, $CH_2=CH-O-(CH_2-CH_2O)_n-CH=CH_2$, where $n$ is a positive integer having a value up to about 1000 or higher; multi-functional vinylethers, such as 1,2,3-propane trivinyl ether, trimethylolpropane trivinyl ether, prepolymers having the formula,

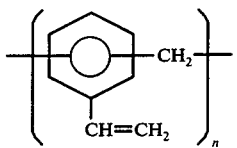

low molecular weight polybutadiene having a viscosity of from 200 to 10,000 centipoises at 25° C, etc. Products resulting from the cure of such compositions can be used as potting resins, crosslinked coatings, printing inks, etc.

A further category of the organic materials which can be used to make polymerizable compositions are cyclic ethers which are convertible to thermoplastics. Included by such cyclic ethers are, for example, oxetanes such as 3,3-bischloromethyloxetane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as β-lactones, for example, propiolactone, cyclic amines, such as 1,3,3-trimethylazetidine and organosilicon cyclics, for example, material included by the formula,

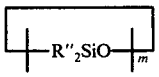

where R″ can be the same or different monovalent organic radicals such as methyl or phenyl and $m$ is an integer equal to 3 to 8 inclusive. An example of an organosilicon cyclic is hexamethyl trisiloxane, octamethyl tetrasiloxane, etc. The products made in accordance with the present invention are high molecular weight oils and gums.

The curable compositions of the present invention can be made by blending the epoxy resin or other cationically polymerizable material, to produce a curable composition containing from 0.1 % to 10 % of onium salt of either formula (1) or (2), based on the weight of the cationically polymerization organic material. The resulting curable composition can be in the form of a varnish, having a viscosity of from 1 centipoise to 100,000 centipoises at 25° C or a free flowing powder can be applied to a variety of substrates by conventional means and cured to the tack free state by the application of ultraviolet light or a combination of ultraviolet light and heat.

Depending upon the compatability of the onium salt with the epoxy resin, the onium salt can be dissolved or dispersed therein along with an organic solvent such as nitromethane, acetonitrile, etc., prior to its incorporation. In instances where the epoxy resin is a solid, incorporation of the onium salt can be achieved by dry milling or by melt mixing the resin whereby the onium salt is incorporated.

Depending upon the nature of the cationically polymerizable organic material, curable compositions of the present invention can be used as molding compounds, adhesives, printing inks, calks and can be applied to such substrates as metal, rubber, plastic, molded parts of films, paper, wood, glass, cloth, concrete, ceramic, etc. The curable compositions may contain inactive ingredients, such as inorganic fillers, dyes, pigments, extenders, viscosity control agents, UV screens, etc., in amounts of up to 100 parts of filler per 100 parts of cationically polymerizable organic material.

In order that those skilled in the art will be better able to practice the invention, the following examples are given by way of illustration and not by way of limitation. All parts are by weight.

EXAMPLE 1

A UV curable composition was prepared by mixing together 70 parts of an epoxy-novolac, specifically Dow DEN 431 and 30 parts of 4-vinylcyclohexene dioxide and 3% by weight of the resulting mixture of triphenylsulfonium trifluoromethane sulfonate. The mixture was coated onto a glass plate and then exposed to UV light for 1 minute. Following this exposure, the sample was heated at 100° C for 5 minutes in a forced air circulating oven. There was obtained a tack free and hard coating.

EXAMPLE 2

A UV curable composition was prepared by blending triphenylsulfonium trifluoromethane sulfonate in an aliphatic bisepoxide CY179 of the Ciba Geigy Company, to produce a 3% solution of the photoinitiator in the resulting mixture. In accordance with the procedure of Example 1, the UV curable composition was irradiated for 60 seconds and thereafter heated at 100° C for 1 hour. There was obtained a hard, fully cured film.

EXAMPLE 3

Curable compositions were prepared of CY-179, a cycloaliphatic bisepoxide, having respectively, 3% by weight triphenylsulfonium trifluoromethane sulfonate and 3% by weight silver trifluoromethane sulfonate. The respective compositions were coated as 3 mil films onto glass plates, and then irradiated using a G.E. H3T7 medium pressure mercury arc lamp for one minute. The two samples were then placed in a forced air circulating oven at 110° C. After 15 minutes, the samples containing triphenylsulfonium trifluoromethane sulfonate was hard and could not be scratched with a finger nail. At the same time, the sample containing silver trifluoromethane sulfonate was very tacky and appeared not to have cured.

Based on the teaching in Kropp U.S. Pat. No. 3,842,019, one skilled in the art would expect that cure of the silver trifluoromethane sulfonate composition would occur after about 60 minutes of additional heating at 110° C.

Two additional samples of the above curable compositions containing 3% by weight triphenylsulfonium trifluoromethane sulfonate was prepared. One sample was applied as a 3 mil coating onto an aluminum panel and heated in a circulating oven for 2 hours at 120° C. No gelation occurred. The other sample was allowed to stand at room temperature for a period of two weeks in the dark. No evidence of gelation was noted.

Those skilled in the art would know that photocurable compositions have superior pot life at ambient temperatures and at elevated temperatures.

EXAMPLE 4

Diphenyliodonium trifluoromethane sulfonate was prepared by combining equimolar solutions of silver trifluoromethane sulfonate and diphenyliodonium chloride in 95% ethanolic solution filtering silver chloride and partially evaporating the solution to afford crystalline diphenyliodonium trifluoromethane sulfonate.

A mixture containing 3% diphenyliodonium trifluoromethane sulfonate in Epon 828 epoxy resin was exposed for 2 minutes to ultraviolet light as described in the preceeding example. The film was then heated at 110° C for 5 minutes. A clear hard film was obtained which could not be scratched with a finger nail.

EXAMPLE 5

Triphenylsulfonium fluorosulfonate was prepared by slowly adding 59.8 parts of a 50% aqueous solution of triphenylsulfonium chloride to 500 parts of water containing 0.5 mole fluorosulfonic acid. An immediate precipitate of triphenylsulfonium fluorosulfonate was obtained. It was filtered and washed with water.

The above sulfonium salt was dissolved in propylene carbonate. There was added 0.3 part of the dissolved salt to 10 parts of Epon 828 epoxy resin. The mixture was applied as a 2 mil coating onto a steel panel. It was irradiated for a period of 2 minutes using a G.E. H3T7 medium pressure mercury arc lamp followed by a heat treatment at 110° C for 20 minutes. There was obtained a composite having a hard and tack-free coating.

EXAMPLE 6

A curable composition was prepared consisting of 10 parts diethyleneglycol divinyl ether and 0.3 part of triphenylsulfonium trifluoromethane sulfonate. The mixture was coated as a 3 mil film onto a steel panel and then irradiated using a G.E. H3T7 medium pressure mercury arc lamp for 2 minutes. The film was allowed to stand at room temperature for one hour. The resulting coating was hard, tack-free and could not be removed by rubbing with acetone.

EXAMPLE 7

There was added 598 parts of triphenyl sulfonium chloride as a 50% aqueous solution to 19.4 parts of sodium toluenesulfonate dissolved in 150 parts of water. A cream colored precipitate was obtained which was filtered. Based on method of preparation it was triphenylsulfonium toluenesulfonate. It was washed with water and then dryed overnight.

A mixtue of 10 parts of Epon 828 epoxy resin containing 4% by weight of the above sulfonium salt was spread as a 3 mil film onto a glass plate and irradiated for 5 minutes. The resulting film was then cured for 1 hour in an oven at 120° C. A hard clear cross-linked coating resulted which could not be removed after it had been immersed in toluene for one hour.

EXAMPLE 8

A solution containing 10 parts of Ciba Geigy novolac epoxy resin ECN 1299, 0.3 part of triphenylsulfonium trifluoromethane sulfonate and 32.5 part of methylene chloride was coated into a copper clad epoxy glass circuit board. The solvent was allowed to evaporate to give a dry film on the circuit board. The above coated circuit board was then covered with a mask and exposed for one minute to ultraviolet light from a G.E. H3T7 medium pressure mercury arc lamp. After heating the coating for 15 minutes at 120° C, it was washed with acetone. A clear reproduction of the mask was obtained. The circuit board was next etched with ferric chloride. The organic coating was then removed by immersing the circuit board in methylene chloride.

Although the above examples are limited to only a few compositions of the present invention, it should be understood that the compositions of the present invention include a much broader variety of onium salts, such as shown by formulas (1) and (2), and cationically polymerizable material as set forth in the description preceding the examples. In addition, after an exposure to ultraviolet light, tack-free cures can be achieved at tempreatures of from 25° C to 250° C.

What I claim as new and desire to secure by Letters Patent of the United States is:

1. Curable compositions comprising:
   (A) a cationically polymerizable organic material selected from the class consisting of oxirane containing organic resins, vinyl organic monomers, vinyl organic prepolymers, cyclic organic ethers, cyclic organic esters, cyclic organic sulfides, cyclic amines and organic silicon cyclics, and
   (B) from 0.1% to 10% by weight of the cationically polymerizable organic material of the radiation sensitive sulfonium salt of the formula,

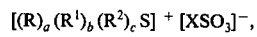

where R is a monovalent aromatic organic radical, $R^1$ is a monovalent organic aliphatic radical selected from alkyl, cycloalkyl and substituted alkyl, $R^2$ is a polyvalent organic radical forming a heterocyclic or fused ring structure selected from aliphatic radicals and aromatic radicals, $a$ is a whole number equal to 0 to 3 inclusive, $b$ is a whole number equal to 0 to 2 inclusive, $c$ is a whole number equal to 0 to 1, where the sum of $a + b + c$ is a value equal to 3, and X is a member selected from aromatic hydrocarbon radicals having from 6–13 carbon atoms, alkyl radicals having from 1–8 carbon atoms, halogenated derivatives thereof and fluorine.

2. A curable composition in accordance with claim 1, where oxirane containing organic resin is a mixture of an epoxy-novolac and 4-vinylcyclohexene dioxide.

3. A composition in accordance with claim 1, where the onium salt is triphenylsulfonium trifluoromethane sulfonate.

4. A curable composition in accordance with claim 1, where the cationically polymerizable organic material is diethyleneglycol divinyl ether.

5. A curable composition in accordance with claim 1, where the sulfonium salt is triphenylsulfonium fluorosulfonate.

6. A curable composition in accordance with claim 1, where the sulfonium salt is triphenylsulfonium toluene sulfonate.

* * * * *